United States Patent [19]

DiCiaccio

[11] 4,091,541

[45] May 30, 1978

[54] LINEAR MEASURING APPARATUS

[75] Inventor: James J. DiCiaccio, Somerville, Mass.

[73] Assignee: Itek Corporation, Lexington, Mass.

[21] Appl. No.: 512,811

[22] Filed: Oct. 7, 1974

[51] Int. Cl.$^2$ .................. B23Q 17/02; G01B 3/00
[52] U.S. Cl. .................. 33/125 R; 33/125 M; 33/141 F
[58] Field of Search .............. 33/125 R, 125 M, 1 M, 33/1, 141 F, 141 B; 74/230.5, 230.18, 230.24, 229, 244

[56] References Cited

U.S. PATENT DOCUMENTS

| | | | |
|---|---|---|---|
| 198,451 | 12/1877 | Deutsch | 74/229 |
| 676,797 | 6/1901 | Miller | 74/229 |
| 720,143 | 2/1903 | Hildreth | 198/224 |
| 1,492,320 | 4/1924 | Copeland | 33/134 R |
| 2,180,065 | 11/1939 | O'Brien | 74/230.5 |
| 2,274,512 | 2/1942 | Weimer | 74/230.5 |
| 2,661,231 | 12/1953 | Caldwell | 74/230.5 |
| 3,449,833 | 6/1969 | Dzula | 33/125 M |
| 3,611,819 | 10/1971 | Muller et al. | 33/1 M |

*Primary Examiner*—Steven L. Stephan
*Attorney, Agent, or Firm*—Homer O. Blair; Robert L. Nathans; Gerald H. Glanzman

[57] ABSTRACT

A linear measuring system for precisely measuring distances along a rather long measurement axis. The apparatus includes an endless measuring cable which is held under tension between a metering drum at one end of the system and an idler drum at the other end. The measuring cable is wrapped around a groove, which has a semicircular cross sectional shape, on the circumference of the measuring drum, and is wrapped similarly around the idler drum. The cable is coupled to an object, the movement of which is to be measured, and movement of the object results in linear movement of the cable and rotational movement of the metering drum. A rotary encoder, which produces a digital output signal, is coupled to the metering drum to measure linear movement of the object. The accuracy of the measurement depends upon maintaining a constant measuring diameter of the metering drum and the measuring cable, and also upon maintaining a tight frictional bond between the measuring cable and the metering drum. This is accomplished by utilizing a measuring cable which has a diameter slightly larger than the diameter of the semicircular groove in the metering drum, and further having a flexible cross sectional area such that when the cable is placed in the groove under tension it flows into the groove to maintain a constant measuring diameter and also to form a tight frictional bond between the cable and the groove.

3 Claims, 5 Drawing Figures

LINEAR MEASURING APPARATUS

BACKGROUND OF THE INVENTION

The present invention relates generally to the conversion of a linear movement to an electrical signal representative of that movement, and more particularly pertains to a new and improved linear measuring system for accurately converting a rather large linear movement into a precise digital signal representative of that movement.

One approach to the construction of a linear encoder is illustrated in U.S. Pat. No. 3,791,037, issued to DiCiaccio et al. This instrument is capable of accurately measuring linear movement along a linear measuring axis. The present invention was designed as an alternative approach to that design and in particular was designed to measure linear movement along a linear measuring axis longer than that capable of being handled efficiently by the system illustrated in that patent. More particularly, the present invention was designed to measure linear movement along a one hundred foot measuring axis, although the principles of operation of this invention might be utilized in both shorter and longer measuring systems.

SUMMARY OF THE INVENTION

In accordance with a preferred embodiment, a linear measuring system is disclosed which is capable of very accurate linear measurements over a rather large distance. In the preferred embodiment a metering drum, which has a groove around its circumference, is supported for rotational movement, and rotational movement of the metering drum is precisely measured. A measuring cable is coupled to an object to measure linear movement thereof, and is placed around the metering drum in the groove under tension such that linear movement of the cable results in rotational movement of the metering drum. The measuring cable has a cross sectional shape slightly larger than the shape of the groove, and has a flexible cross sectional area such that when it is placed under tension in the groove it flows into the groove to maintain a constant measuring diameter which forming a tight frictional bond which allows very accurate measurements to be taken.

DESCRIPTION OF A PREFERRED EMBODIMENT

Figure 1:
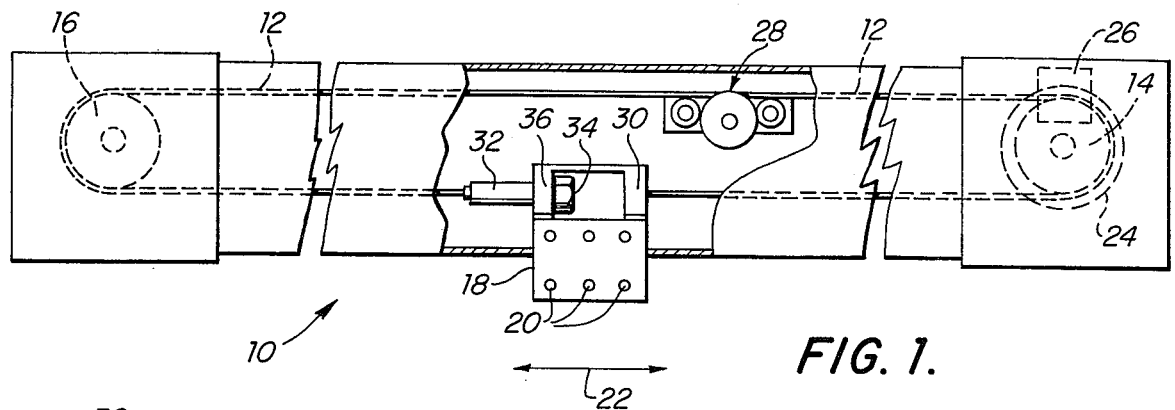
FIG. 1 is a simplified illustration of the overall arrangement of the present invention.

Referring to FIG. 1, there is illustrated a simplified view of the linear measuring system 10 of the present invention. The measuring system includes a measuring cable 12 which extends in an endless configuration between a metering drum 14 at one end of the sytem and an idler drum 16 at the other end of the system. The cable 12 is connected to a mechanical coupler 18 which is adapted to be mechanically coupled, as by bolts or other fasteners through holes 20, to an object the linear movement of which is being measured. In a typical application of the present invention, the mechanical coupler 18 is connected to a machine tool to measure its travel. One embodiment of the present invention was designed for a measuring run of approximately one hundred feet between the metering and idler drums.

The measuring system operates in the following manner. Linear movement of mechanical coupler 18 along the direction 22 of the measuring axis results in movement of the measuring cable 22 and rotary movement of both metering and idler pulleys. The metering pulley is utilized in a measuring function as will be described, while the idler pulley is utilized primarily for a cable return function in the endless configuration of the measuring cable. Rotary movement of metering pulley 14 results in rotary movement of an encoder disc 24 which is attached to the shaft on which the metering pulley 14 rotates and is rotatable therewith. An encoder reading station 26 is positioned adjacent to the encoder disc 24 to detect rotational movement of the disc relative to the reading station. The encoder disc and reading station are constructed in accordance with technology well known in the encoder arts, and accordingly a more detailed explanation will not be given herein. In the preferred embodiment the encoder is an incremental type of encoder which produces a digital pulse train indicative of movement of the encoder disc relative to the reading station. The system may have one or more cable vibration absorber assemblies 28 positioned along the top run of the measuring cable. The vibration absorber assemblies consist of one or more pulleys positioned adjacent to the cable to damp vibration of the cable.

With the measuring system of the present invention, the tension of the measuring cable must be precisely set to obtain an accurate measurement. The measuring cable terminates in one end 30 of the mechanical coupler 18 where it may be held securely by set screws or other fastening means. The other end of the measuring cable terminates in a fixture 32 which includes a threaded end upon which an adjustment nut 34 is mounted. The mechanical coupler has a shoulder 36 against which the nut 34 is positioned, and by tightening or loosening nut 34 the tension in the cable may be adjusted to a particular desired setting. In other embodiments other types of tension adjustment arrangements might be utilized. The tension of the measuring cable is important to maintain accurate operation of the present invention as a uniform tension ensures that the measuring cable will repeatedly flow in the same manner into the groove on the metering drum to establish the same measuring diameter. Also, the amount of tension on the cable affects its diameter, and accordingly the tension must be adjusted to establish the diameter of the measuring cable at a particular value.

Figure 2:
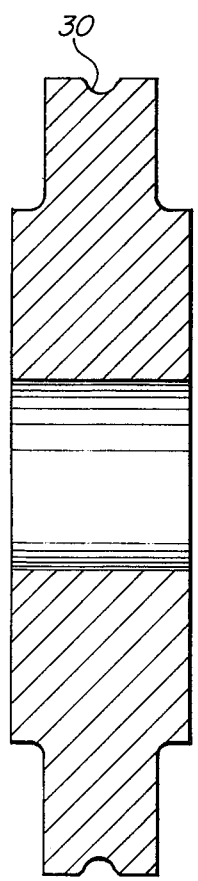
FIG. 2 is a cross sectional view of the metering drum.
Figure 3:
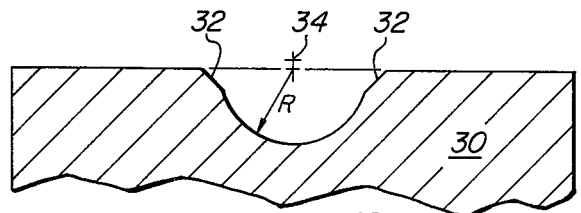
FIG. 3 is an enlarged view of the groove cut into the circumference of the metering drum.

FIG. 2 illustrates a cross sectional view of the metering pulley of the present invention, and FIG. 3 illustrates an enlarged cross sectional view showing details of the groove in the circumference of the metering pulley into which the measuring cable fits. The idler pulley is not shown in detail. It may have the same configuration as the metering pulley, but its configuration is not critically important as with the metering pulley. The groove 30 is a substantially semicircular shaped groove having a radius R and chamfered edges 32. In one embodiment the radius R was 0.05 inches, and the edges were chamfered at a 45° angle to a depth below the circumference of 0.01 inches. The chamfered edges aid in allowing the tensioned measuring cable to flow into the groove, but they are not essential and in some embodiments may be omitted.

Figure 4:
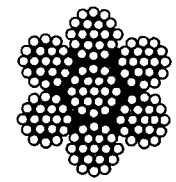
FIG. 4 is a partial cross sectional view of the measuring cable.

FIG. 4 illustrates a partially cross sectioned view of the measuring cable. As shown, the measuring cable is substantially circular in shape and has a radius which is slightly larger than the radius of the groove by an increment $\Delta R$ (i.e., it is $R + \Delta R$). The measuring cable is formed of many fine interwound wires such that its cross sectional area is flexible and such that when the cable is placed in the groove under tension the individual wires allow the cable to change its cross sectional shape slightly such that the cable literally flows into the groove. The flowing of the tensioned cable into the groove causes the cable and grooved metering pulley to maintain substantially the same measuring diameter at all times, and also forms a tight frictional bond between the cable and the groove, which is also very important for accuracy. In one embodiment the cable had a nominal 3/32 inch diameter and was stainless steel cable aircraft type 7 × 19 which means the cable is formed of seven interwoven wire bundles with each wire bundle containing nineteen strands of wire. This cable is available from Hacknsack Cable Corp., Hackensack, N.J. The measuring diameter, technically termed the pitch diameter, defines the number of turns that the encoder disc makes for a given linear movement of the measuring cable, and is defined by the center of the measuring cable. Because the cable is slightly larger in diameter than the semicircular groove, the center of the cable is at a point 34, a bit above the center of the semicircular groove.

Figure 5:
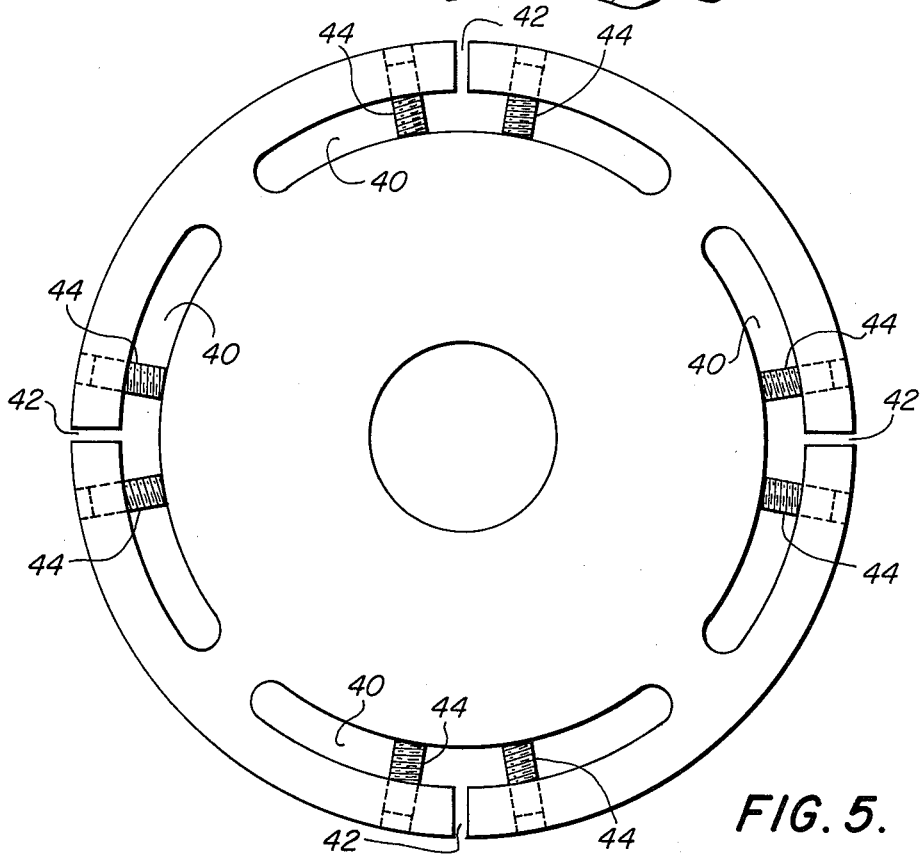
FIG. 5 is a side view of the metering drum, and illustrates how the diameter of the drum may be altered slightly to scale factor of the system.

FIG. 5 illustrates a side view of the measuring drum, and in particular shows how the measuring system may be scale factored by slightly changing the diameter of the measuring drum. The measuring drum has four equally spaced slots 40 cut into it. Each slot extends for approximately an 80° arc. Each slot is cut at its center at 42 to form eight cantilevered sections around the circumference of the measuring drum. Each cantilevered section has a set screw 44 positioned therein which extends down against the bottom of the slot below it such that the set screw may be screwed against the bottom of the slot to force the cantilevered section upward slightly to expand the diameter of the metering pulley. This adjustment renders the metering pulley slightly out-of-round. However, the out-of-roundness is not sufficiently great to present a measurement accuracy problem.

It is important that the metering drum be as temperature stable as possible. In the preferred embodiment the metering drum was constructed of INVAR (trade name of Carpenter Steel Co.) to provide a drum with a very low coefficient of thermal expansion. The expansion of other system components with temperature may also affect the accuracy of the measurements. Accordingly, the measuring cable was chosen of stainless steel to have substantially the same expansion characteristics as a typical cast iron machine tool base upon which the measuring system will be mounted. Thus the cable and base will expand and contract substantially in unison, which eliminates many problems associated with these dimensional changes.

While several embodiments have been described, the teachings of this invention will suggest many other embodiments to those skilled in the art.

I claim:

1. A system for accurately measuring the linear movement of an object comprising:
   a. a metering drum having a groove around its circumference, said groove having a substantially semicircular cross sectional shape of given radius;
   b. means for supporting said metering drum for rotational movement about a drum axis;
   c. a measuring cable supported around said metering drum in said groove and adapted to be coupled to said object for linear movement therewith such that linear movement of said measuring cable will result in a corresponding rotational movement of said metering drum about said drum axis, said measuring cable having a generally circular cross sectional shape the radius of which is slightly larger than said given radius of said groove, said measuring cable further including means responsive to the application of tension thereto for slightly changing the cross sectional shape thereof;
   d. means for applying tension to said measuring cable for causing said cable to slightly change its cross sectional shape and flow into said groove to form a very tight frictional bond between said cable and said groove, said tension applying means including means for maintaining a substantially constant, uniform tension on said cable for maintaining the cross sectional shape of said cable in said groove substantially constant and uniform at all times whereby the linear movement of said cable and, hence, of said object, can be very accurately measured by measurement of the rotational movement of said metering drum;
   e. means for measuring the rotational movement of said metering drum about said drum axis; and
   f. wherein said metering drum includes means for adjusting the radius of said metering drum to adjust the scale factor of the system.

2. A system as set forth in claim 1 wherein the circumference of said metering drum is formed of a plurality of cantilevered sections, and wherein said means for adjusting the radius of said metering drum comprises means for changing the position of each cantilevered section to change the radius of the metering drum.

3. A system for accurately measuring the linear movement of an object comprising:
   a. a metering drum having a groove around its circumference, said groove having a substantially semicircular cross sectional shape of given radius;
   b. means for supporting said metering drum for rotational movement about a drum axis;
   c. an idler drum spaced from said metering drum;
   d. a measuring cable supported around said metering drum and around said idler drum in an endless cable configuration, said measuring cable being supported around said metering drum in said groove and adapted to be coupled to said object for linear movement therewith such that linear movement of said measuring cable will result in a corresponding rotational movement of said metering drum about said drum axis, said measuring cable having a generally circular cross sectional shape the radius of which is slightly larger than said given radius of said groove, said measuring cable being composed of multiple individual strands of wire formed into a bundle to define said cable such that the wires may move relative to each other to slightly change the cross sectional shape of the measuring cable upon the application of tension thereto;

e. means for applying tension to said measuring cable for causing said cable to slightly change its cross sectional shape and flow into said groove to form a very tight frictional bond between said cable and said groove, said tension applying means including means for maintaining a substantially constant, uniform tension on said cable for maintaining the cross sectional shape of said cable in said groove substantially constant and uniform at all times whereby the linear movement of said cable and, hence, of said object, can be very accurately measured by measurement of the rotational movement of said metering drum;

f. means for measuring the rotational movement of said metering drum about said drum axis; and g. wherein said metering drum includes means for adjusting the radius of said metering drum to adjust the scale factor of the system.

* * * * *